United States Patent
Ding et al.

(12)

(10) Patent No.: US 8,925,040 B2
(45) Date of Patent: Dec. 30, 2014

(54) PREVENTING MULTIPLE BACKEND CALLS AT BROWSER LAUNCH DURING MOBILE BROADBAND PROVISIONING

(75) Inventors: Jihui Ding, Bridgewater, NJ (US); Pargat Singh Sandhu, Rogers, AR (US)

(73) Assignee: Cellco Partnership, Basking Ridge, NJ (US)

( * ) Notice: Subject to any disclaimer, the term of this patent is extended or adjusted under 35 U.S.C. 154(b) by 671 days.

(21) Appl. No.: 12/817,856

(22) Filed: Jun. 17, 2010

(65) Prior Publication Data
US 2011/0314518 A1    Dec. 22, 2011

(51) Int. Cl.
*H04L 29/06* (2006.01)
*H04L 12/24* (2006.01)
*H04W 12/06* (2009.01)
*H04L 29/12* (2006.01)

(52) U.S. Cl.
CPC ........ *H04L 41/0806* (2013.01); *H04L 63/0892* (2013.01); *H04L 63/10* (2013.01); *H04W 12/06* (2013.01); *H04L 29/12037* (2013.01); *H04L 61/106* (2013.01)
USPC .......................................................... 726/4

(58) Field of Classification Search
CPC .................. H04L 41/0806; H04L 63/100892; H04L 61/106; H04L 29/12037; H04W 12/06
USPC .......................................................... 726/4
See application file for complete search history.

(56) References Cited

U.S. PATENT DOCUMENTS

| | | | |
|---|---|---|---|
| 2002/0199020 A1* | 12/2002 | Trace et al. | 709/245 |
| 2002/0199104 A1* | 12/2002 | Kakemizu et al. | 713/168 |
| 2003/0087633 A1* | 5/2003 | Yoon | 455/418 |
| 2004/0177152 A1* | 9/2004 | Aviran | 709/235 |
| 2008/0108321 A1* | 5/2008 | Taaghol et al. | 455/410 |
| 2009/0154663 A1 | 6/2009 | Thaper et al. | |
| 2009/0156176 A1 | 6/2009 | Hao et al. | |
| 2011/0184841 A1* | 7/2011 | Sood et al. | 705/34 |

FOREIGN PATENT DOCUMENTS

| | | |
|---|---|---|
| DE | 102007023843 | 11/2008 |
| WO | WO-99/33291 | 7/1999 |
| WO | WO-00/44148 | 7/2000 |

OTHER PUBLICATIONS

"What is 802.1X?", InteropNet labs Full Spectrum Security Initiative, Jan. 1, 2005, pp. 1-2, XP55013576, URL:http://www.opus1.com/nac/whitepapers-old/02-what_is_8021x-lv05.pdf [retrieved on Nov. 30, 2011], Jan. 1, 2005.
John Vollbrecht, et al., Wireless LAN Access Control and Authentication, Jan. 1, 2002, pp. 1-30, XP55013574, URL:http://www.interlinknetworks.com/whitepapers/WLAN_Access_Control.pdf [retrieved on Nov. 30, 2011], Jan. 1, 2002.

* cited by examiner

*Primary Examiner* — Jeffrey D Popham

(57) ABSTRACT

To reduce or avoid multiple calls for authentication, during mobile device provisioning for broadband connectivity which might otherwise be caused by add-ons associated with a browser, a provisioning gateway or server system maintains a database of records of source addresses and associated mobile numbers. The records may also indicate time of last request from each address. In response to a new request, the system determines if there is a record for the source address. If there is a record, and in our example, if the record indicates that time since the last prior request is less than a threshold value, then the system continues provisioning processing for the device but without any communication with an authentication system. However, if there is no record or if the last request from a source address is older than the threshold, then the system communicates with the authentication system to obtain the directory number for the mobile device.

12 Claims, 4 Drawing Sheets

PREVENTING MULTIPLE BACKEND CALLS AT BROWSER LAUNCH DURING MOBILE BROADBAND PROVISIONING

TECHNICAL FIELD

The present subject matter relates to techniques and equipment to reduce or avoid repetitive communications to a backend system, such as an authentication, authorization, and accounting system, during mobile device provisioning for broadband connectivity service which might otherwise be caused by add-on programs associated with a browser on a computer or the like that is communicating through the mobile device.

BACKGROUND

In recent years, mobile communication services have expanded and increased in popularity, around the world. Many advanced networks offer wireless mobile communication service for voice calls, mobile messaging services (e.g. text and/or multimedia) and data communications. The data services, for example, enable surfing the world wide web, e.g. via a browser. For example, a tablet computer or a laptop or handheld personal computer (PC) with mobile broadband connectivity enables a user to conduct a wide range of data communications from anywhere that a carrier's network provide wireless data service.

A variety of different types of mobile devices support data communications through a public mobile wireless communications network. Some mobile phone stations that have data communication capabilities can be connected to another terminal device such as a PC, so that the station can act like a modem for data communications to and from the terminal device. Alternatively, a user may have an 'air card' for insertion in or connection to the data terminal device. Some terminal devices may be sold which include integral air cards. If a mobile customer subscribes to Verizon Wireless' Mobile Broadband Connect (MBC) service or a similar broadband connectivity feature for his/her mobile device, then the customer can use the device as modem and connect it to PC or the like to browse the Internet. The user can access the Internet via the mobile device and the public mobile network once the subscription is set-up with the carrier.

The first time a user tethers a computer to his/her mobile device, as a modem for the broadband connectivity service (e.g. MBC), and launches a web browser, the device's home agent in the network communicates with the AAA (authentication, authorization, and accounting) system to determine if the user has the broadband DUN (Dial-Up Networking) feature on his/her account for the particular device. If not, the home agent directs the browser client communication to a Self-Provisioning Gateway (SPG). The SPG provides one or more web pages and obtains user information. The SPG communicates with several network support systems on the 'backend' to authenticate the user, add the DUN feature to the user's account for the particular mobile device, and obtain an IP address for the mobile device.

However, before provisioning can be completed, an add-on running in the user's PC or the like may attempt to connect to a web server for one or more tasks, such as checking for updates or adding new toolbar buttons, when the add-on is automatically launched along with the browser. Many PCs have a number of such add-ons that launch with the web browser program, each of which will attempt an Internet communication to a server when the browser is launched. Hence, several add-ons acting through the browser in the PC keep making data calls while the mobile device is connected to the PC. For every such data call that occurs during the connectivity provisioning, a new session is created, and an http request is sent. As a result, the home agent in the network will repeatedly redirect those data call requests to the SPG. Hence, such add-ons cause the user's mobile device (handset or air card) to send multiple requests (one for each attempted web access by the browser and through it by each active add-on) to the SPG before the first request is fully processed. In such a case, the SPG would forward all of the requests to the AAA system to validate the device's IP address, and the AAA system may become overloaded in times of peak usage with multiple redundant requests for many MBC data users.

Hence a need exists for an improved way to handle multiple requests caused by add-ons during the initial provisioning for the broadband connectivity service for a mobile device.

SUMMARY

The teachings herein alleviate one or more of the above noted problems with mobile broadband connectivity provisioning for a mobile device, for example, to reduce or avoid multiple calls for authentication purposes, during mobile device provisioning for broadband connectivity service which might otherwise be caused by add-on programs associated with a browser on a computer or the like that is communicating through the mobile device.

For example, the detailed description below discloses a method of provisioning broadband connectivity service of a wireless mobile communication network for a mobile device. The method may entail a system hosting a provisioning server program receiving a first data communication request from a client browser program running on a user's data device, via a mobile device coupled to the data device and the wireless mobile communication network. In response to the first request, the server system communicates with an authentication, authorization, and accounting system of the wireless mobile communication network to obtain a mobile number assigned to the mobile device. A record is stored which contains the mobile number assigned to the mobile device and a data communication address used by the mobile device during communication with the system. The server system also initiates a provisioning process, to provision broadband connectivity service of the wireless mobile communication network for the mobile device. The server system may also receive a second data communication request via the wireless mobile communication network. Upon determining from the stored record that the second data communication request uses the data communication address used by the mobile device as the source address, the provisioning process continues, but the server system does not communicate with the authentication, authorization, and accounting system of the wireless mobile communication network in response to the second request.

In a specific example, the method further involves including a time stamp in the record. The time stamp indicates a time corresponding to the receiving of the first data communication request in the system hosting the provisioning server program. In the specific example, the determining step is responsive to a determination that the second data communication request using the data communication address is received in the server system at a time less than a threshold time value later than the time indicated by the time stamp in the record. The record may be updated with a time stamp indicating a time corresponding to the receiving of the second request in the system hosting the provisioning server program. However, for a received third data communication request, having the data communication address used by the mobile device as the source address, if received at a time greater than the threshold time value later than the time indicated by the time stamp in the record, the server system treats the third request as a new request from a different unprovisioned mobile device. In this later case, the system communicates with the authentication, authorization, and accounting system of the wireless mobile communication network to obtain a mobile number assigned to another data device and stores a record containing the mobile number assigned to the other data device and the data communication address. The server also initiates a provisioning process, to provision broadband connectivity service of the wireless mobile communication network for the other mobile device.

The method as outlined above related to processing in relation to requests received from one source address/mobile device/data terminal arrangement. The detailed disclosure, however, also encompasses expansion of the methodology to processing for multiple mobile devices and attendant techniques for managing the records.

A specific example of such a method involves receiving data communication requests from client browser programs running on data devices, via respective mobile devices coupled to the data devices and the wireless mobile communication network, in a system hosting a provisioning server program. A database contains records of a plurality of data communication addresses used by the mobile devices during communications with the system and times of last received requests from respective data communication addresses. In response to each request received, the server system checks the database to determine if it contains a record for a source data communication address used in the received request.

For each respective request received having a source data communication address for which there is no record in the database, the server system communicates to an authentication, authorization, and accounting system of the wireless mobile communication network to obtain a mobile number assigned to the data device from which the respective request is received. A new record, containing the mobile number assigned to the mobile device from which the respective request is received and the source data communication address used by that mobile device during communication with the system, is stored in the database. The server system also initiates a provisioning process, to provision broadband connectivity service of the wireless mobile communication network for the mobile device from which the respective request is received.

In a similar fashion, for each respective request received having a source data communication address for which there is a record in the database but for which more than a threshold time has passed since a previous request was received, the server system communicates with the authentication, authorization, and accounting system to obtain a mobile number assigned to the mobile device from which the respective request is received. In this case, the system updates the database record of the source data communication address used by that mobile device during communication with the system with the mobile number assigned to the data device from which the respective request is received. The server system also initiates a provisioning process, to provision broadband connectivity service of the wireless mobile communication network for the mobile device from which the respective request is received.

However, for each respective request received having a source data communication address for which there is a record in the database but for which less than the threshold time has passed since a previous request was received, the system continues provisioning processing but without communicating with the authentication, authorization, and accounting system.

The system may also mark records as failed or successfully completed, depending on outcomes of provisioning processes/transactions. The processing then may further entail deleting from the database at least some records that are marked as failed and some records that are records marked as completed. For example, the deleting step may be performed periodically, in which case, each periodic performance of the deleting step involves deleting from the database all records marked as failed and all records marked as completed for longer than a predetermined time interval.

The threshold for continuing processing without further communication to the authentication, authorization, and accounting system may be in terms of seconds (e.g. 20 seconds) after which a new request from the same source address can be treated as a request from a different mobile device. By comparison, the predetermined time interval for deletion of records for addresses for which provisioning transactions are marked failed and/or completed is longer than the threshold time, e.g. in terms of one or more days, weeks or months.

Other concepts relate to unique software for implementing the provisioning for broadband connectivity, with attendant processing to avoid calls to the authentication element in response to data communication requests from add-ons during the provisioning process. A software product, in accord with this concept, includes at least one machine-readable medium and information carried by the medium. The information carried by the medium may be executable program code, one or more databases and/or information regarding the provisioning related operations. Other concepts relate to a computer or the like configured as a provisioning platform, e.g. by inclusion of such programming.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

To reduce or avoid multiple calls for authentication, during mobile device provisioning for broadband connectivity which might otherwise be caused by add-on programs associated with a browser, a provisioning gateway or server system maintains a database of records of addresses and associated mobile numbers. The records may also indicate time of last request from each source address. In response to a new request, the system determines if there is a record for the source address. In the example, if there is no record or the time since the last request from a source address as indicated in as record is longer that a threshold, then the system communicates with an AAA (authentication, authorization, and accounting) system to obtain the directory number for the mobile device. However, if there is a record, and in our example, if the record indicates that time since the last prior request is less than the threshold, then the system continues provisioning processing for the device but without any communication with AAA system.

Figure 1:
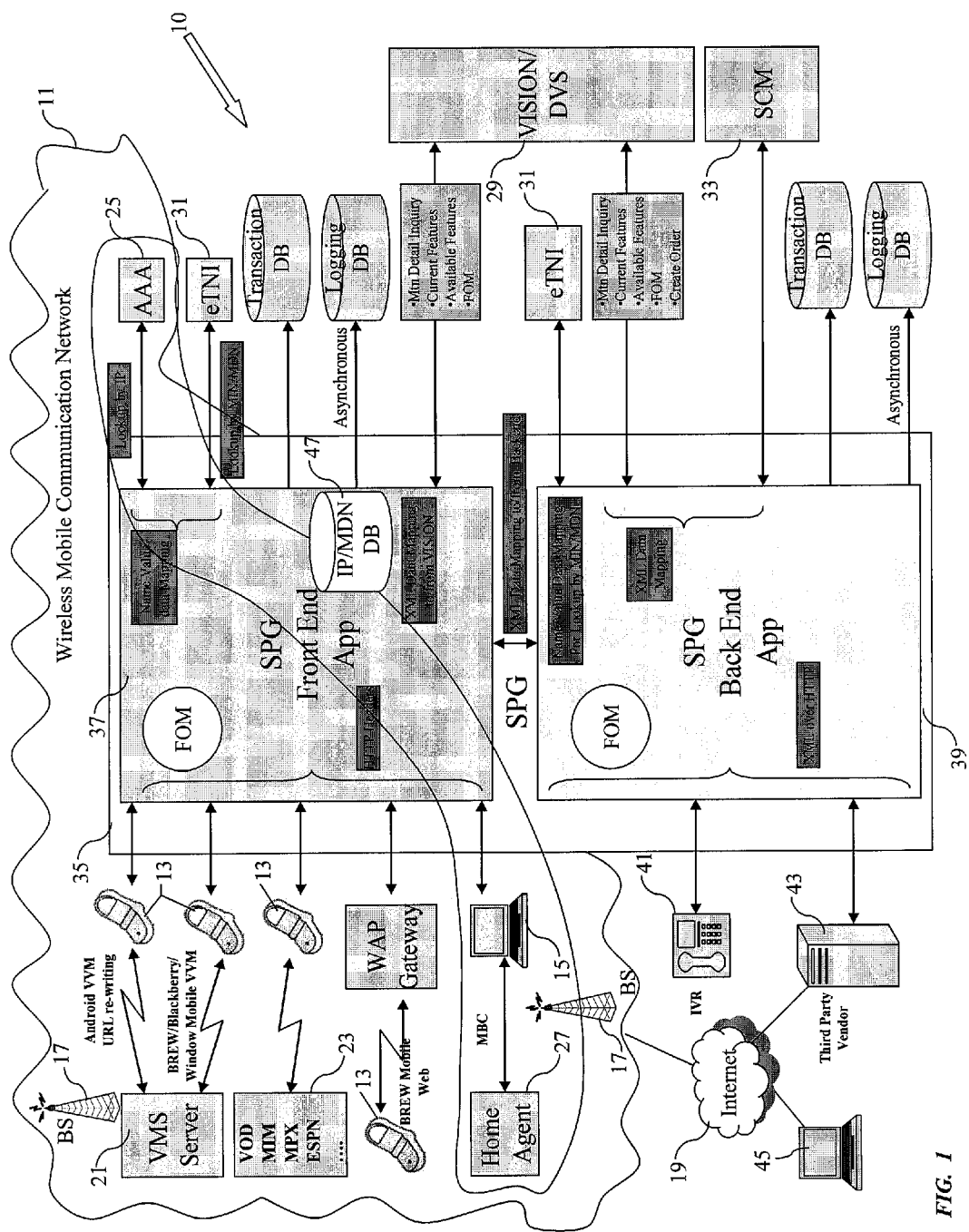
FIG. 1 is a functional block diagram of a system, including a network and various platforms operated in support of the network, as might implement provisioning for broadband connectivity for users of mobile devices.

Reference now is made in detail to the examples illustrated in the accompanying drawings and discussed below. FIG. 1 illustrates a system 10 encompassing a carrier's mobile communication network 11 and various platforms operated in support of the network 11, as might implement provisioning for broadband connectivity for users of mobile devices. For purposes of a representative example, the drawing shows and we will discuss an example for provisioning a mobile device for the Verizon Wireless Mobile Broadband Connect (MBC) service, and we will use specific terms applicable to that service example. Those skilled in the art will appreciate, however, that the present teachings are applicable to provisioning for other similar broadband connectivity services and that the exemplary terms such as MBC are not limiting.

The network 11 provides mobile wireless communications services to a substantial number of mobile devices 13, just a few examples of which appear in the drawing. Several of the mobile devices are shown as mobile handsets, and some of those handsets may be coupled to data devices (not separately shown) to allow the data devices to use the network 11 for data communications services. For discussion purposes, the drawing shows one data device 15 which incorporates an air card type mobile device for wireless communications via the network 11.

The mobile communication network 11 provides mobile wireless communications services to the various mobile devices 13, 15, for example, via a number of base stations (BSs) 17. The present techniques may be implemented in any of a variety of available mobile networks and/or on or for any type of mobile device compatible with such a network 11 and its broadband connectivity service. The drawing shows only a very simplified example of the traffic portion of the network 11 for purposes of discussion here but instead shows more of the elements as may be involved in provisioning, particularly for the broadband connectivity service.

The network 11 allows users of the mobile devices such as 13, 15 to initiate and receive telephone calls to each other and send and receive various types of voice, text and multimedia messages. The network 11 also allows users of the mobile devices with the broadband connectivity service to communicate data, for example, via the Internet 19 or through various intranets (not shown), for example, for downloads, web browsing, email, etc. Modern implementations of the networks 11 and 19 also allow voice over data communication, typically as voice over internet protocol (VoIP) communications, via a data session through the network 11 and the Internet 19 for those mobile devices having data communication capability and appropriate voice over packet protocol functionality.

The network 11 offers a wide range of services, and different users may choose to subscribe to different combination of those services. A subscriber's choice of services may change over time. As subscribers add services, it is necessary for the carrier to provision the network and sometimes the subscribers' mobile devices to provide the service and possibly bill the subscriber for the service depending on the commercial aspects of the service contract.

For purposes of illustration and discussion of a few service examples, the drawing shows several platforms that the network 11 may include in order to support communication services for which the network 11 will be provisioned, for those mobile devices 13 or 15 of subscribers who chose to subscribe to those services. For example, the drawing shows a voice mail system (VMS) implemented as a server 21. Enhanced versions of VMS servers 21 may support visual voice mail (VVM). The network 11 would also include other servers 23 supporting one or more other services such as mobile video on demand (VOD) and Mobile Instant Messaging (MIM), to name just two examples.

The network 11 also supports a wireless mobile broadband connectivity service, which for purposes of our descriptive example we will refer to as Mobile Broadband Connect service or MBC. The MBC service may be provisioned with respect to a mobile handset type device 13 having appropriate data communications capabilities, e.g. for browsing or the like from the handset and/or for use as a mobile broadband modem for another tethered data device. The MBC service also may be provisioned with respect to an air interface card, as may be connected to or incorporated into the data device. In the example of FIG. 1, the personal computer (PC) type data device 15 includes such an air interface card type mobile device integrated into the PC. Hence, the card is not separately shown.

The wireless mobile communication network 11 includes various switches or routers as well as other elements to control the communications through the network 11. The drawing shows only two control elements, an authentication, authorization, and accounting (AAA) system 25 and a home agent (HA) 27, because those elements are involved in the provisioning procedures discussed by way of example below.

The home agent (HA) 27 routes data packets addressed to a mobile device to that device as the device roams. The HA is usually a node of the 'home' regional network serving the particular subscriber. To facilitate forwarding of incoming packets to a roaming mobile device, the HA 27 maintains an identification of the particular point of attachment for the mobile device, such as the IP address currently assigned to the device by the foreign agent (not shown) through which the device most recently registered for roaming data service. The HA 27 also facilitates device/user validation and attendant access control through an interaction with the AAA system 25, during session set-up. At one or more points in the processing of a call for a data communication session set-up through the HA, the HA 27 accesses the AAA system 25 to obtain call access authorization.

As part of this authorization procedure, the AAA system 25 will determine whether or not a particular device has authorization for a requested service and will instruct the HA 27 whether or not to grant a requested access to the service. For example, if a mobile device has been provisioned for MBC, the AAA 25 instructs the HA 27 to initiate a data communication session through the network 11, for browsing or the like. However, a subscriber may not yet be subscribed to and/or provisioned for a particular service such as MBC.

The system 10 also includes a number of systems operated by the carrier in support of its network services, although not directly involved in providing or controlling the actual network service(s). For example, the carrier will also operate a number of systems that provide ancillary functions in support of the communications services provided through the network 10, and those elements communicate with other nodes/elements of the network 10 via one or more private IP type packet data networks (sometimes referred to as an Intranet—not shown). The support elements, for example, include one or more systems of record, such as a Vision billing system 29, which includes subscriber account records.

Other such support systems shown by way of example include instances of the enterprise telephone number inventor (eTNI) database 31 and a Service Creation and Management (SCM) server 33. The eTNI database 31 maintains an inventory of the telephone numbers allotted to the carrier and those available for carrier assignment to customer equipment. For example, another of the carrier's systems may access the eTNI database 31 to obtain a telephone number for assignment to a newly activated mobile device 13 or 15. The SCM server 33 enables rapid introduction of premium data products and management of third party content, applications and services for the subscribers of the mobile carrier. Third party content, for example, may include Wireless Application Protocol ("WAP") 2.0, videos, games, ringtones, messages, images, audios, and voting.

To allow users to access provisioning functions for the various network and content services offered through the network 11, the carrier operating the network 11 deploys a self-provisioning gateway (SPG) system 35 coupled into the network 11 and coupled to one or more private networks for communications with the various control and support systems. Although only one such SPG system 35 is shown for convenience, to handle a high volume provisioning traffic load and/or to provide redundancy, the SPG system may be implemented on a number of distributed computer platforms. In the example, the SPG system 35 includes applications running on one or more appropriately connected computers for an SPG frontend 37 and an SPG backend 39.

The SPG system 35 provides various voice and data interfaces for different devices, to allow users to interact with the system 37 and initiate provisioning of desired services or features, in an automated manner. The SPG backend system 39, for example, may connect to an interactive voice response (IVR) platform to allow users to call-in from any telephone 41 to initiate provisioning. As another example, the SPG backend system 39 may connect to a third party website server 43 to allow users to access the system via the Internet 19 and a regular landline-connected PC 45. Of note for purposes of our discussion, for the MBC service, the frontend part 37 of the SPG system 35 functions as a server system hosting the carrier's provisioning website. Various mobile devices 13, 15 may access the provisioning website, via data communications through the wireless mobile communication network 11, to provision MBC or any other service that the carrier may offer. For purposes of discussing specific examples, we will most often refer to access to the website offered via the SPG frontend 37 from the exemplary PC type data device 15, with its incorporated or connected air card as the actual mobile device.

The SPG backend 39 interacts with the other carrier systems to implement the actual service provisioning steps. In the example, the SPG frontend 37 is the frontend for mobile access to the carrier's provisioning website, and other elements like 41 and 43 provide alternative user interfaces. The SPG backend 39 performs the provisioning related functions for mobile device provisioning, for all of the different user interfaces.

Each of the SPG sections will connect to or include various database systems in which they can maintain records of their activities. By way of examples, the drawing shows each associated with a general logging database (DB) and a transaction database (DB).

The SPG will provide a variety of information to assist a user in adding a service for their mobile device. For example, each SPG section may implement a feature optimization module (FOM). A FOM analyzes a user's feature selection and provides recommendations, e.g. for addition of other features required to implement the requested feature or to suggest other related features that users often want when they obtain the requested feature.

The techniques to reduce or avoid repetitive communications to an authentication, authorization, and accounting system, during mobile device provisioning for broadband connectivity service relate to provisioning involving the website user interface offered by the SPG frontend 37 and may be implemented by appropriate modification or upgrade of the process flow control programming for the frontend 37 as executed on one or more of the server computer platforms that function as the SPG frontend. Further discussion of examples therefore will focus on the provisioning and related operations for the exemplary PC type data device 15 via the SPG frontend 37.

The method that the SPG frontend 37 uses to authenticate users for MBC was modified to include a cache table in a database 47 for records that hold each user's device MDN, IP address, and a time stamp.

When a user operates the PC type data device 15 to launch a web browser, the device attempts network communication, typically to receive a website identified as the user's 'home page'. The device 15 sends an http request message through the network 11. The network 11 routes the message to the home agent for the air card type mobile device associated with the data device 15. In response, the home agent 27 communicates with the AAA system 25 to determine if the user has the broadband DUN (Dial-Up Networking) feature for MBC on his/her account for the particular device. If not, the home agent 27 directs the browser client communication to the SPG frontend 37. When the initial http request message reaches the SPG frontend 37, the frontend sends one or more web pages and obtains user information to perform provisioning functions.

The SPG frontend 37 communicates with several network support systems on the 'backend' to authenticate the user and add the DUN feature to the user's account for the particular mobile device. In particular, the request will include an IP address assigned to the device 15 in the source address field of the IP packets, and the SPG frontend 37 communicates with the AAA system 25 to obtain a mobile directory number (MDN) or mobile telephone number (MTN) and/or a mobile identification number (MIN) for the air card (mobile device) used by the PC 15 in our example.

However, before provisioning can be completed, an add-on running in the user's PC or the like may attempt to connect to a web server for one or more tasks, such as checking for updates or adding new toolbar buttons, when the add-on is automatically launched along with the browser. Many PCs have a number of such add-ons that launch with the web browser program, each of which will attempt an Internet communication to a server when the browser is launched. Hence, several add-ons acting through the browser in the PC 15 keep making http request type data calls while the mobile device is connected to the PC 15. In such a scenario, the one data device 15 actually sends some number of http communications requests, all of which are forwarded by the home agent 27 to the SPG frontend 37, during the ongoing provisioning operations.

It should also be noted that the network mobile communication network 11 assigns IP addresses to mobile devices 13, 15 on a dynamic basis. A given device 13 or 15 may keep a particular IP address for a relatively short period of time. As a result, another mobile device may later attempt data communication and be routed to the SPG frontend 37, but use the same IP address as its source address. Unlike the add-on scenario, however, the later request from the same source IP address after address reassignment by the network 11 is actually a request that the SPG frontend 37 should treat as a valid new request for provisioning: of another device and treat in the normal manner.

In the example, the SPG frontend 37 will maintain a record in the database 47 for each source IP address received in such incoming requests. The record for an IP address will include the MDN of the mobile device used by the PC 15 to communicate with the SPG system 35 as well as a time stamp indicating the time of the last request received from/having the particular source IP address.

If the IP address is not present in the table or the last request with the IP address as a source address is older than some threshold amount (e.g. more than 20 seconds old), then the request received from that source address is treated as a new request (from a different mobile device after dynamic reassignment of the IP address). If there was no entry in the table, then an inquiry is then sent on to the AAA system for validation, and the frontend 37 will create a new record in the database table based upon the request front the session, e.g. with the IP address and MDN combination and with a time stamp indicating the time of receipt of the current request. Similarly, if the last request is older than the threshold, an inquiry is sent on to the AAA system for validation. Also, the record for that address is updated with a new time stamp indicating the time of receipt of the current request and with the MDN of the air card or other mobile device of the data terminal that is now the subject of the new provisioning operations.

If there is a record for the IP address and MDN combination in the database table 47 already pending from sometime less than the threshold, e.g. from the previous 20 seconds in our example, then the new request is ignored. In particular, the SPG frontend 37 does not send another query to the AAA system 25 for authentication and/or to obtain the MDN. The SPG frontend 37 updates the IP address record with a new time stamp indicating the time of receipt of the current request, and provisioning of the MBC for the particular mobile device through the SPG system 35 continues. This approach results in a threshold of time in which a single request is sent to the AAA system 25 for each user session and prevents overloading from multiple requests as might otherwise result from add-ons running in association with the browser on the data device 15.

The approach outlined above may provide one or more of the following advantages. The AAA system provides services to many clients. This disclosed example insures that the SPG is not overloading the AAA system with unnecessary requests with respect to the same IP address within a particular threshold of time, which improves the performance of the AAA system and the SPG application by reducing the network overhead and improving bandwidth.

Figure 2:
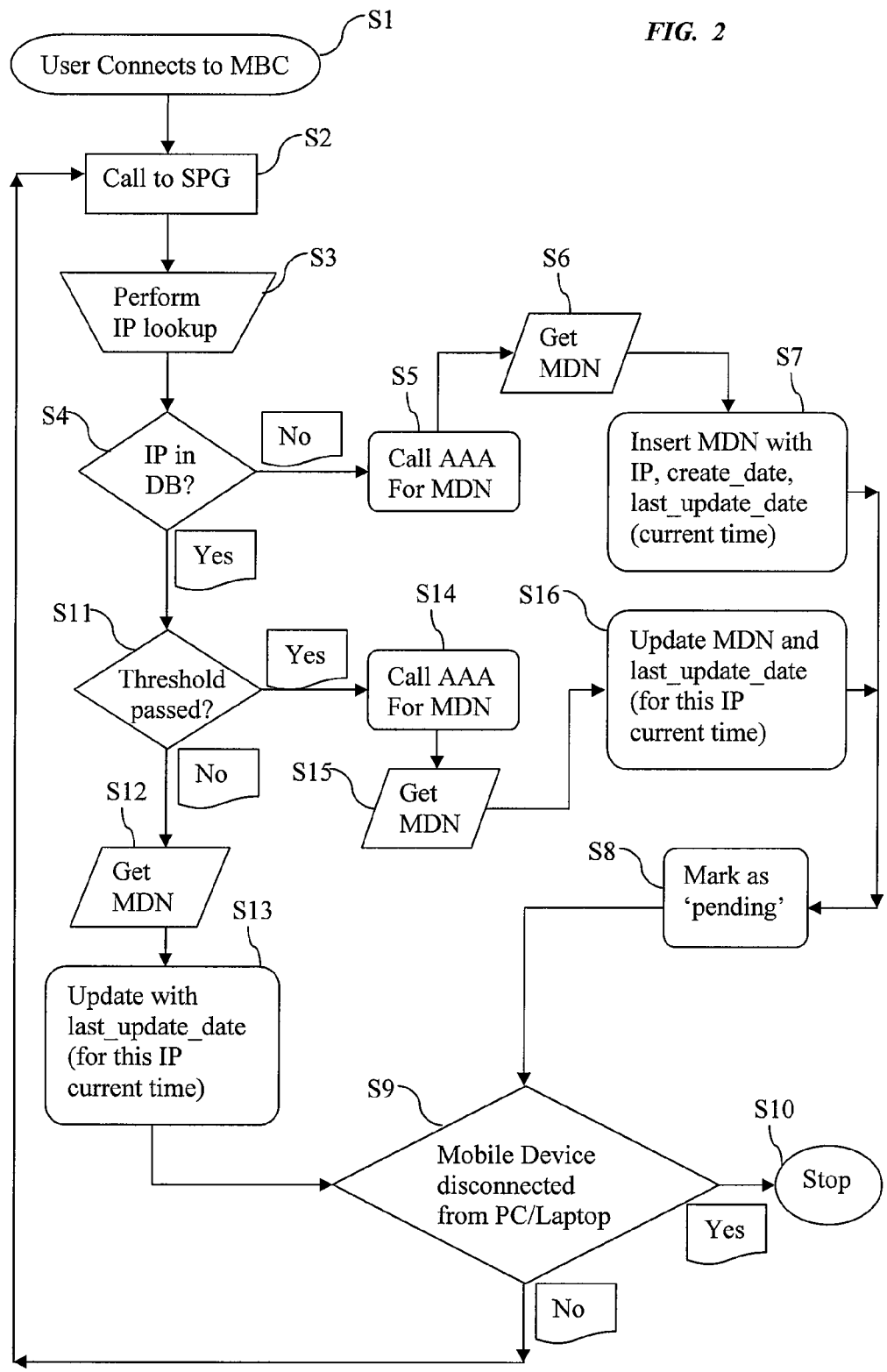
FIG. 2 is a flow chart of a portion of a provisioning process implemented by a self-provisioning gateway of the system of FIG. 1.

It may be helpful to consider a more detailed example of a process flow for MBC provisioning via the SPG, with the reduction in repetitive communications to the AAA system that might otherwise be caused by add-on programs associated with the browser on data device during its SPG communication via the mobile device. FIG. 2 illustrates an exemplary process flow for a relevant portion of a provisioning process implemented by the SPG frontend 37 in the system 10.

The process of FIG. 2 starts at step S1 when the user first tethers a computer 15 to his/her mobile device, e.g. the internal air card, and launches the web browser. The web browser launches an initial data communication request, e.g. an http request for a home page or other first web page. As mentioned earlier, the device's home agent 27 communicates with the AAA system 25 to determine if the user has the broadband DUN feature on his/her account for the particular device. At this point in our example, the feature has not been provisioned for the mobile device associated with data device 15. Hence, the AAA system 25 causes the home agent to redirect the browser client communication to the SPG 35. At step S2, the SPG frontend 37 hosting the carrier's provisioning server program receives the data communication request from the client browser program running on a user's data device 15, via the mobile device coupled to the data device 15 and the wireless mobile communication network 11

In response, the SPG frontend provides at least one web page, such as a landing page for the provisioning server program advising the user of the provisioning options and/or for obtaining user information. In response to the each received request, the SPG frontend 37 does a lookup in the database 47 based on the source IP address contained in the request. At step S4, the process flow branches based on whether or not there is a record for the source IP address already in the table. Initially, we will consider an example in which the request is a first request from the data device 15 and there is no record for the source IP address in the table 47. Hence, at this point in our example, the SPG frontend 37 determines there is no record in the database 17, and the process flow at S4 branches to step S5.

In step S5, the SPG frontend 37 makes a data inquiry or call to an AAA system 25 of the wireless mobile communication network 11; and in response, the AAA system 25 sends back a mobile directory number (MDN) or the like that the network has assigned to the user's mobile device which the SPG frontend 37 gets in step S6. In this example, this is the first call from the data device 15 for provisioning the user's mobile device and there is no record for the IP address that the network has currently temporarily assigned to that mobile device. Hence, in step S7, the SPG frontend 37 inserts the MDN it received from the AAA system 25 and the source IP address and creates a new record for inclusion in the database 47. In this way the SPG frontend 37 creates and stores a record that contains the mobile number assigned to the mobile device and a data communication address used by the mobile device during communication with the system. The SPG frontend 37 also includes a time stamp in the record. The time stamp indicates a time corresponding to the receiving of the first data communication request at the SPG frontend 37. The SPG frontend 37 also marks the record as 'P' for pending (step S8), while the frontend 37 initiates a provisioning process, to provision broadband connectivity service of the wireless mobile communication network for the mobile device. Aspects of the provisioning process, including communication with other systems such as the SPG backend 39 and the Vision system 29 go forward as is normal and are omitted from FIG. 2 for simplicity.

With respect to initial request processing and backend calls such as to the AAA, the SPG frontend 37 will wait and continue provisioning processing for the mobile device. If the mobile device disconnects, e.g. is disconnected from the PC or laptop data device 15, then the session is terminated and processing by the SPG frontend 37 branches from step S9 to a stop at step S10.

However, if the PC or laptop data device 15 is running any add-ons, then the SPG frontend 37 may also receive a second data communication request via the wireless mobile communication network, in which case, processing by the SPG frontend 37 branches from step S9 back to step S2, where the SPG frontend 37 hosting the carrier's provisioning server program again receives a data communication request or call from the client browser program (caused by the add-on) running on the user's data device 15, via the mobile device coupled to the data device 15 and the wireless mobile communication network 11 (because the mobile device is not yet provisioned for MBC service). In response to the this second received request, the SPG frontend 37 again does a lookup in the database 47 (S3) based on the source IP address contained in the request; and processing branches at step S4 based on whether or not there is a record for the source IP address already in the table.

In this example of a second or subsequent data request, when the SPG frontend 37 again does the lookup in the database 47, now there is a record for the source IP address already in the database 47. Therefore, processing at S4 now branches to step S11.

In step S11, the SPG frontend 37 looks at the time that has passed (elapsed) since the last prior request from the source IP address, as indicated by the time stamp in the database record for that address. If the time between the last prior request and the new request from the source IP address is less than the threshold, the processing branches from step S11 to step S12. Further provisioning-related processing could continue after S11, without further SPG activity except to wait for completion/termination or another request from this source IP address. With this scenario, however, the SPG frontend 37 does not communicate with the AAA system 25 of the wireless mobile communication network 11 responsive to the second request.

However, in the example, the SPG frontend 37 may retrieve the MDN associated with the source IP address from the record for further use (step S12). For example, the SPG frontend 37 may use the MDN to conduct other provisioning related functions much like would be done in response to the first request. Such an approach assumes that any repetitive provisioning requests, to the SPG backend 39, Vision, etc., will not cause problems and/or may be dismissed or ignored by the system or systems receiving such a subsequent processing request from the SPG frontend 37.

Although not separately shown, when the SPG frontend 37 gets the MDN at step S12, the frontend 37 may update the record for the source IP address in the database 47 with a time stamp indicating a time corresponding to the receiving of the second request (S13).

After step S13, processing again flows to step S9. The SPG and other systems will continue provisioning processing for the mobile device. Again, if the mobile device disconnects, e.g. is disconnected from the PC or laptop data device 15, then the session is terminated and processing by the SPG frontend 37 branches from step S9 to a stop at step S10. It may be noted that if this call is from add-on and if the validation criteria fail for this MDN fail, the status is set to 'F' which means the transaction has Failed.

The flow from step S9 back through steps S2, S3, S4, S11 and S12 may repeat as any add-ons in the data device 15 attempt new communications. As long as these subsequent requests are received before passage of the time threshold since the preceding request, the SPG frontend 37 will continue network provisioning for the mobile device to obtain the MBC service, but the SPG frontend 37 will not communicate again with the AAA system 25 responsive to any such further requests. In this way, the procedure reduces or eliminates duplicate signaling to the AAA system as might otherwise be caused by multiple communication attempts generated by add-on programs in the data device 15.

However, at this point in our example, we will consider the situation where a longer period of time has passed since the last prior request.

As noted, the network 11 dynamically assigns IP addresses. Although a particular mobile device may have an IP address assigned thereto at one time, it may lose that address, e.g. after some period of inactivity, and obtain another IP address if/when needed later. As long as communications from the device continue to come in during the provisioning, due to user communications and/or add-on communications, the time stamp in the record can be updated with the time of the latest message/request receipt. The threshold is set to a value long enough that it might be assumed that if the device 15 is inactive for such a period, it is no longer involved in the one provisioning session and the address has or soon will be reassigned to another mobile device.

In our example, when a new request is received, processing flows back to step S2 where the SPG frontend 37 hosting the carrier's provisioning server program again receives a data communication request from a data device/mobile device because the requesting device does not yet have the MBC service (again because the mobile device sending the request is not yet provisioned for MBC service). The mobile device could be the same as in the earlier examples, but for which provisioning has not yet been successfully completed; but often, the request will be from a different mobile device that is not provisioned for the MBC service.

For this third type of received data communication request, the SPG frontend 37 again does a lookup in the database 47 (S3) based on the source IP address contained in the request; and processing branches at step S4 based on whether or not there is a record for the source IP address already in the table. At this point in our example, when the SPG frontend 37 again does the lookup in the database 47, there is a record for the source IP address already in the database 47. Therefore, processing at S4 again branches to step S11.

In step S11, the SPG frontend 37 looks at the time that has passed (elapsed) since the last prior request from the source IP address, as indicated by the time stamp in the database record for that address. In this third situation, the elapsed time is greater than the threshold (time since last previous request is longer than the threshold value), therefore the processing at S11 now branches to step S14.

Because the time lapse is greater than the threshold, the SPG frontend will now treat the request as a new request requiring regular treatment for authentication and provisioning. In step S14, the SPG frontend 37 makes a data inquiry or call to an AAA system 25 of the wireless mobile communication network 11; and in response, the AAA system 25 sends back the MDN or the like that the network has assigned to the user's mobile device which the SPG frontend 37 gets in step S14. In this example, this third request processing occurs after lapse of the threshold time, however, there is an address record in the database 47 for the respective source IP address. Hence, in step S15, the SPG frontend 37 updates the MDN field in the record to reflect the different MDN just received from the AAA system 25 in step S14. The SPG frontend 37 also updates the time stamp in the record to reflect the current time for its receipt/processing of the latest communication request from the source IP address. The SPG frontend 37 again marks the record as 'P' for pending at step S8 and stores the updated record for the source IP address in the database 47. Although not shown in FIG. 2, the SPG frontend 37 also initiates a provisioning process, to provision broadband connectivity service of the wireless mobile communication network for the mobile device indicated by the newly obtained MDN. Further processing with regard to the device(s) indicated by the IP address and new MDN combination will proceed in a manner as discussed above relative to the first request.

The discussion of FIG. 2 above focused on processing in relation to requests received from one source address. In practice, the SPG will handle similar provisioning for many devices for users seeking MBC service from the network 11 and those devices will use many IP addresses. There are a variety of nuances to the SPG processing, for example, that may help with management of the records in the database 47. For example, over time, the database 47 grows substantially in size as the SPG handles provisioning for devices that use different IP addresses.

Figure 3:
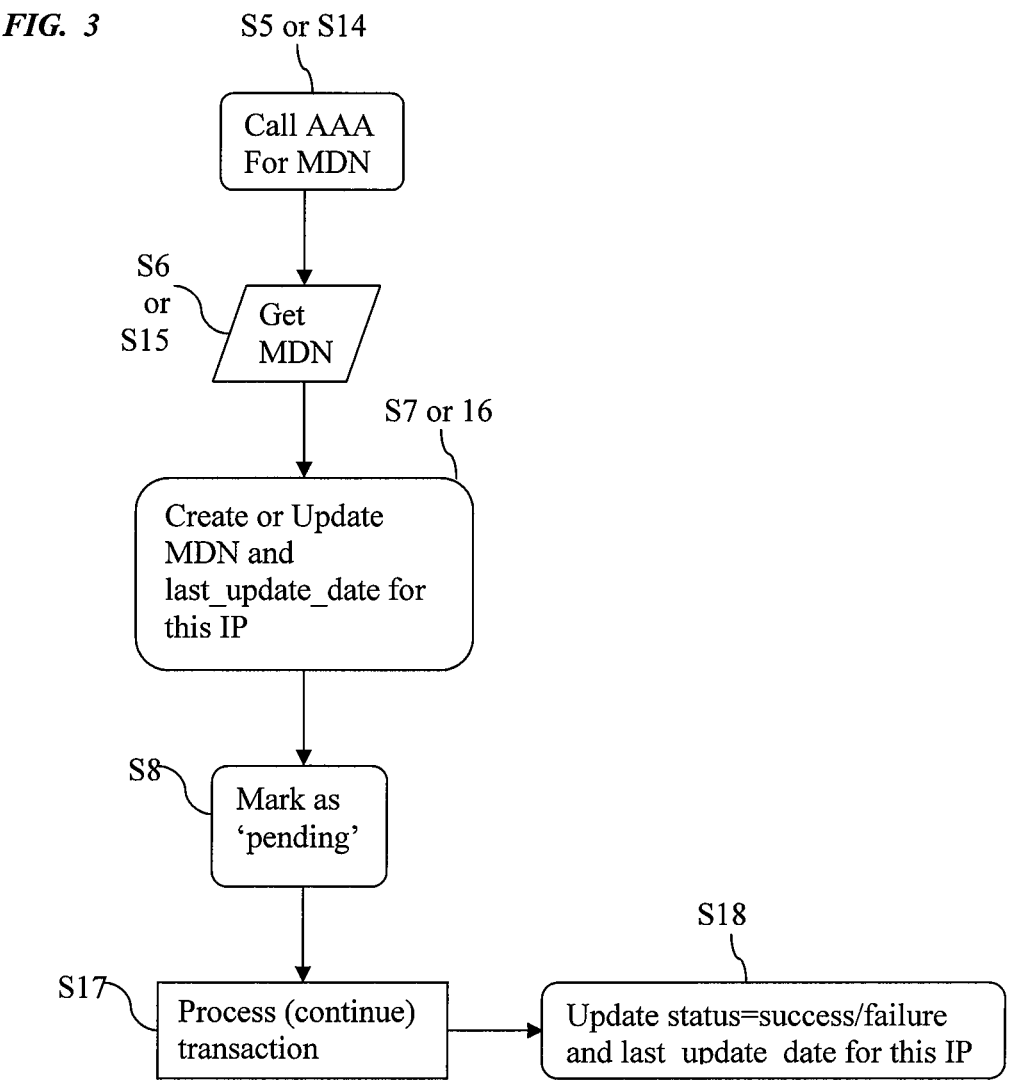
FIG. 3 is a flow chart of another portion of the provisioning process implemented by a self-provisioning gateway of the system of FIG. 1.
Figure 4:
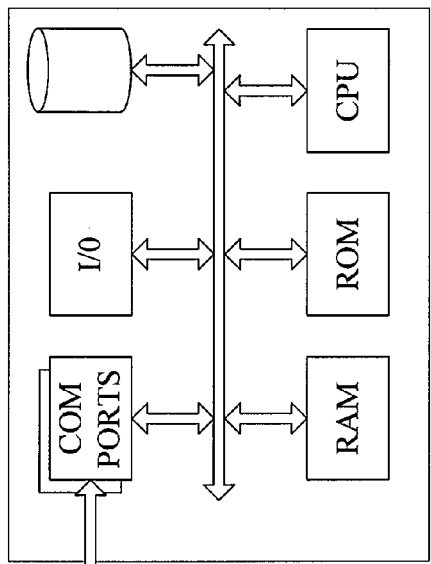
FIG. 4 is a simplified functional block diagram of a computer that may be configured as a host or server, for example, to function as all or a portion of the self-provisioning gateway in the system of FIG. 1.

FIG. 3 shows an example of part of the SPG frontend processing with respect to one IP address, that may later help to manage the record in the database. As outlined above, the SPG frontend 37 will call the AAA system 25 for the MDN of a device having a particular source IP address (step S5 or step S14 in the processing of FIG. 2) and will receive a response with that MDN (S6 or S15). Based on that response, the SPG frontend 37 will create or update a record in the database (S7 or S16) and will mark the record as pending (S8). Although not separately shown, if a call is from add-on and if the validation criteria fail for the particular MDN after making the initial call to the AAA, then the SPG frontend will set the status of the record to 'F' which means the transaction has Failed. Transactions may also be marked completed when provisioning is successfully finished.

Assume now, however, that the transaction is pending and the provisioning process continues at S17. When the provisioning process ends, the carrier's systems inform the SPG frontend 37 and it sets the status of the record for the source IP address accordingly (S17). For example, if the provisioning transaction is successfully completed and the network provisions the MBC service for the user's mobile device, then the SPG frontend 37 and it sets the status of the record for the source IP address to 'S' for success. However, the transaction may fail before completion, which may be detected by the SPG frontend as noted earlier or may be signaled by one of the other systems involved in the provisioning transaction. In such a case, SPG frontend 37 sets the status of the record for the source IP address to 'F' for failed. In this way, as it processes communications requests associated with various device-assigned IP addresses, the SPG frontend 37 marks records as pending, failed or successfully completed. Of course, as discussed above relative to FIG. 2, each record includes a time stamp indicating time of last received/processed request. This enables the SPG frontend 37 to delete from the database at least some records that are marked as failed and some records that are records marked as successfully completed. The deletion may be performed periodically. It is also possible to delete transactions that are even marked pending, if they have remained pending for longer than some period of time. For example, all the failed and pending transactions more than one month old are removed from the database using the chron job to improve the performance.

Those skilled in the art will appreciate that the provisioning processes outlined above may be modified in a variety of ways. For example, during the threshold period, the user may disconnect the session, and the same IP address may get assigned to a different user. The chances are very slim but to cover this scenario, a fresh call may be made to AAA using the IP to make sure the correct MDN is being used for the provisioning. This results in one extra call to the AAA system for every user trying to provision the MBC feature, but implementing this threshold filter blocks 20 hits/sec from SPG to the AAA system.

As shown by the above discussion, functions relating to the techniques to reduce or avoid multiple calls for authentication, during mobile device provisioning for broadband connectivity may be implemented on computers connected for data communication via the components of wireless mobile communication network, operating as a provisioning server system, such as the SPG frontend as shown in FIG. 1. Although special purpose devices may be used, such devices also may be implemented using one or more hardware platforms intended to represent a general class of data processing device commonly used to run "server" programming so as to implement the SPG frontend functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the provisioning functions and the authentication call control thereof. The software code is executable by the general-purpose computer that functions as the SPG frontend server device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for techniques to reduce or avoid multiple calls for authentication, during mobile device provisioning for broadband connectivity, in essentially the manner performed in the implementations discussed and illustrated herein.

Figure 5:
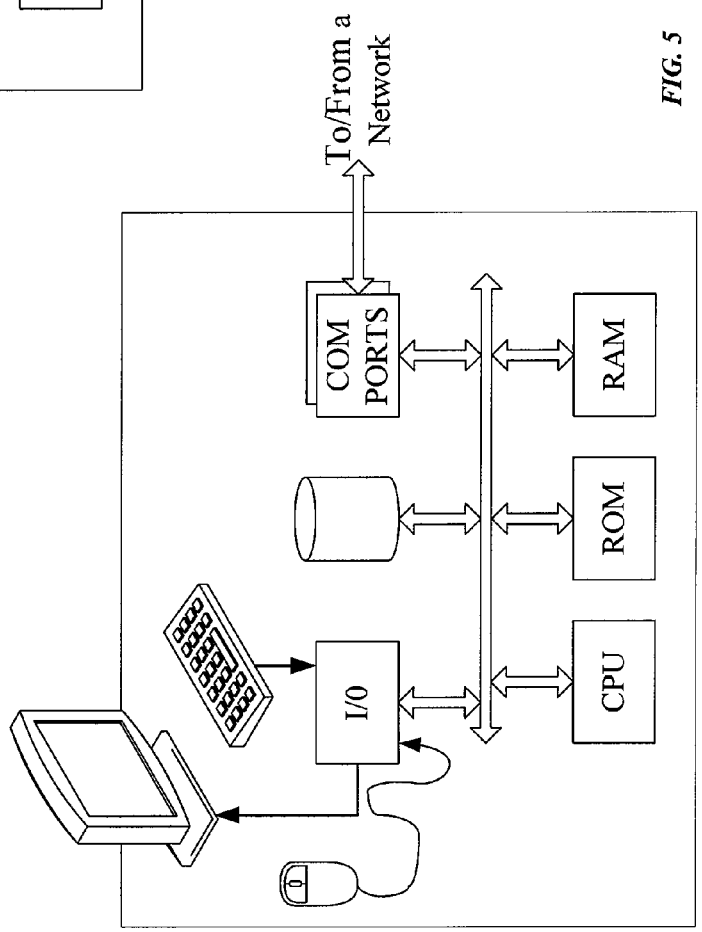
FIG. 5 is a simplified functional block diagram of a personal computer or other work station or terminal device, such

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the techniques to reduce or avoid multiple calls for authentication, during mobile device provisioning for broadband connectivity outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory devices of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the carrier/service provider into the computer platform of the SPG frontend. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the SPG, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

AAA—Authentication Authorization Accounting
BS—Base Station
CD—Compact Disk
CD-ROM—Compact Disk-Read Only Memory
DB—DataBase
DUN—Dial-up Networking
DVD—Digital Versatile (or Video) Disk
DVD-ROM—Digital Versatile (or Video) Disk-Read Only Memory
EEPROM—Electrically Erasable Programmable Read Only Memory
EPROM—Erasable Programmable Read Only Memory
eTNI—Enterprise Telephone Number Inventory
FOM—Feature Optimization Module
HTTP—Hypertext Transfer Protocol
IP—Internet Protocol
IR—Infrared
IVR—Interactive Voice Response
MBC—Mobile Broadband Connect
MDN—Mobile Directory Number
MIM—Mobile Instant Messaging
MIN—Mobile Identification Number
MTN—Mobile Telephone Number
PROM—Programmable Read Only Memory
RAM—Random Access Memory
RF—Radio Frequency
ROM—Read Only Memory
SCM—Service Creation and Management
SPG—Self Provisioning Gateway
URL—Uniform Resource Locator
VOD—Video On Demand
VoIP—Voice over Internet Protocol
VMS—Voice Mail System
VVM—Visual Voice Mail
WAP—Wireless Application Protocol
XML—Extensible Markup Language

What is claimed is:

1. A method, comprising steps of:
receiving a first http data communication request from a client browser program running on a user's data device, via a mobile device coupled to the data device, in a wireless mobile communication network;

based upon a determination via an authentication, authorization, and accounting system that the mobile device is not subscribed to a broadband connectivity service of the wireless mobile communication network, directing the first http data communication request to a system hosting a provisioning server program, for a provisioning website of a carrier operating the mobile communication network;

in response to the first request, communicating from the system hosting the provisioning server program to the authentication, authorization, and accounting system of the wireless mobile communication network to obtain a mobile number assigned to the mobile device;

storing a record containing the mobile number assigned to the mobile device and a data communication address used by the mobile device during communication with the system hosting the provisioning server program;

initiating a subscribing process, to subscribe the mobile device for broadband connectivity service on the wireless mobile communication network, the subscribing process including sending one or more web pages from the system hosting the provisioning server program to the mobile device and obtaining user information responsive to the one or more web pages for subscribing to the broadband connectivity service for the mobile device;

subsequently receiving a second http data communication request from the client browser program running on the data device in the wireless mobile communication network, prior to the completion of the initiated subscribing process to subscribe the mobile device for the broadband connectivity service;

based upon a determination via the authentication, authorization, and accounting system that the mobile device is not yet subscribed to the broadband connectivity service of the wireless mobile communication service, directing the second http data communication request to the system hosting the provisioning server program; and upon determining from the stored record that the second http data communication request received prior to the completion of the initiated subscribing process uses the data communication address used by the mobile device as a source address, continuing the subscribing process initiated in response to the first http data communication request, without again communicating from the system hosting the provisioning server program to the authentication, authorization, and accounting system of the wireless mobile communication network responsive to the second request.

2. The method of claim 1, further comprising a step of:
including a time stamp in the record, indicating a time corresponding to the receiving of the first http data communication request in the system hosting the provisioning server program,
wherein the step of continuing the subscribing process is responsive to a determination that the second http data communication request using the data communication address used by the mobile device is received in the system hosting the provisioning server program at a time less than a threshold time value later than the time indicated by the time stamp in the record.

3. The method of claim 2, further comprising a step of updating the record with a time stamp indicating a time corresponding to the receiving of the second request in the system hosting the provisioning server program.

4. The method of claim 3, further comprising steps of:
receiving a third http data communication request from a client browser program running on a user's data device the wireless mobile communication network, the third http data communication request having the data communication address used by the mobile device as the source address;
directing the third http data communication request to the system hosting the provisioning server program;
upon determining that the third http data communication request is directed to the system hosting the provisioning server program at a time greater than the threshold time value later than the time indicated by the time stamp in the record, communicating from the system hosting the provisioning server program to the authentication, authorization, and accounting system of the wireless mobile communication network to obtain a mobile number assigned to another data device;
storing a record containing the mobile number assigned to the other data device and the data communication address; and
initiating a subscribing process, to subscribe the other mobile device for broadband connectivity service on the wireless mobile communication network.

5. The method of claim 1, wherein the subscribing process comprises:
adding the broadband connectivity service to an account of the user of the mobile device for service through the wireless mobile communication network; and
providing broadband connectivity to the user's data device via the mobile device.

6. The method of claim 1, wherein the subscribing process comprises:
sending information to and collecting information from the user of the data device; and
in response to collecting the information, provisioning the mobile device for the broadband connectivity service of the wireless mobile communication network by adding the broadband connectivity service to an account for the mobile device.

7. A method, comprising steps of:
receiving http data communication requests from client browser programs running on data devices, via respective mobile devices coupled to the data devices and the devices, in a wireless mobile communication network;
based upon determinations via an authentication, authorization, and accounting system that the respective mobile devices are not subscribed to a broadband connectivity service of the wireless mobile communication network, directing the http data communication requests to a system hosting a provisioning server program for a provisioning website of a carrier operating the mobile communication network;
maintaining a database of records of a plurality of data communication addresses used by the mobile devices during communications with the system hosting the provisioning server program and time of last received requests from respective data communication addresses;
responsive to each request directed to the system hosting the provisioning server program, checking the database to determine if it contains a record for a source data communication address used in the received request;
for each respective request directed to the system hosting the provisioning server program, received from one of mobile devices not subscribed to a broadband connectivity service of the wireless mobile communication network, and having a source data communication address for which there is no record in the database:

(a) communicating from the system hosting the provisioning server program to an authentication, authorization, and accounting system of the wireless mobile communication network to obtain a mobile number assigned to the mobile device from which the respective request is received;

(b) storing a new record in the database containing the mobile number assigned to the mobile device from which the respective request is received and the source data communication address used by that mobile device during communication with the system, in the database; and (c) initiating a subscribing process, to subscribe the mobile device from which the respective request is received for broadband connectivity service on the wireless mobile communication network, the subscribing process including sending one or more web pages from the system hosting the provisioning server program to the mobile device from which the respective request is received and obtaining user information responsive to the one or more web pages for subscribing to the broadband connectivity service for the mobile device from which the respective request is received;

for each respective request directed to the system hosting the provisioning server program, received from one of the mobile devices not subscribed to a broadband connectivity service of the wireless mobile communication network, and having a source data communication address for which there is a record in the database but for which more than a threshold time has passed since a previous request was received, (i) communicating from the system hosting the provisioning server program to the authentication, authorization, and accounting system of the wireless mobile communication network to obtain a mobile number assigned to the mobile device from which the respective request is received;

(ii) updating the record of the source data communication address used by that mobile device during communication, in the database, with the mobile number assigned to the mobile device from which the respective request is received; and (iii) initiating another subscribing process, to subscribe the mobile device from which the respective request is received for broadband connectivity service on the wireless mobile communication network, the other subscribing process including sending one or more web pages from the system hosting the provisioning server program to the mobile device from which the respective request is received and obtaining user information for subscribing to the broadband connectivity service for the mobile device from which the respective request is received; and for each respective request directed to the system hosting the provisioning server program, received from one of the mobile devices not subscribed to a broadband connectivity service of the wireless mobile communication network, prior to the completion of the subscribing process of the mobile device from which the respective request is received for the broadband connectivity service, and having a source data communication address for which there is a record in the database but for which less than the threshold time has passed since a previous request was received, continuing a previously initiated subscribing processing for the mobile device from which the respective request is received without again communicating from the system hosting the provisioning server program to the authentication, authorization, and accounting system of the wireless mobile communication network.

8. The method of claim 7, further comprising steps of:

in response to each termination before completion of subscribing processing for the mobile device from which a particular request is received, marking the record in the database for the communication address used as the source address in the particular request as a failed transaction;

in response to each completion of subscribing processing for the mobile device from which a specific request is received, marking the record in the database for the communication address used as the source address in the specific request as a completed transaction; and deleting from the database a plurality of the records marked as failed and a plurality of the records marked as completed.

9. The method of claim 8, wherein:

the deleting step is performed periodically, and each periodic performance of the deleting step comprises deleting from the database all records marked as failed and all records marked as completed for longer than a predetermined time interval.

10. The method of claim 9, wherein the predetermined time interval is longer than the threshold time.

11. The method of claim 7, wherein each subscribing process comprises:

adding the broadband connectivity service to an account of the user of the mobile device for service through the wireless mobile communication network; and providing broadband connectivity to the user's data device via the mobile device.

12. The method of claim 7, wherein each subscribing process comprises:

sending information to and collecting information from a user of a respective data device; and in response to collecting the information, provisioning the respective mobile device for the broadband connectivity service of the wireless mobile communication network by adding the broadband connectivity service to an account for the respective mobile device.

* * * * *